United States Patent [19]  [11] 3,991,968
Yazejian  [45] Nov. 16, 1976

[54] QUICK RELEASE SEAT RETAINER
[75] Inventor: Diran Yazejian, Bloomfield Hills, Mich.
[73] Assignee: Chrysler Corporation, Highland Park, Mich.
[22] Filed: May 27, 1975
[21] Appl. No.: 581,316

[52] U.S. Cl. .............................. 248/501; 248/503; 269/47; 269/236
[51] Int. Cl.² ........................................ F16A 15/00
[58] Field of Search ............... 24/97, 212; 105/464, 105/465; 132/75.5; 248/25, 500–510; 269/47, 49, 94, 235, 236; 292/257

[56] References Cited
UNITED STATES PATENTS

| 480,620 | 8/1892 | Parker et al. | 248/502 |
| 687,177 | 11/1901 | Caldwell | 269/236 X |
| 891,188 | 6/1908 | Schenk | 248/507 |
| 901,561 | 10/1908 | Searing | 248/501 |
| 1,155,376 | 10/1915 | Sherer | 248/501 |
| 1,202,602 | 10/1916 | Staab | 269/236 X |
| 1,836,557 | 12/1931 | Seymoure | 132/75.5 |
| 2,398,962 | 4/1946 | Randrup | 269/47 X |
| 2,908,303 | 10/1959 | Schmidt | 269/235 X |

FOREIGN PATENTS OR APPLICATIONS
199,267  6/1923  United Kingdom ................ 248/501

Primary Examiner—Lawrence J. Staab
Attorney, Agent, or Firm—Talburtt & Baldwin

[57] ABSTRACT

A clamping device adapted to be quickly and easily applied and released for securing objects together. This clamping device is especially useful in connection with removable vehicle seats such as found in van type vehicles where it is desirable that the seats be easily installed or removed. The clamping device comprises a stud member capable of being easily attached to one of the objects such as the vehicle floor and a compression lever which is engageable with the free end of the stud so as to pivot into contact with the other object as, for example, a vehicle seat leg, thereby clamping the objects together.

4 Claims, 5 Drawing Figures

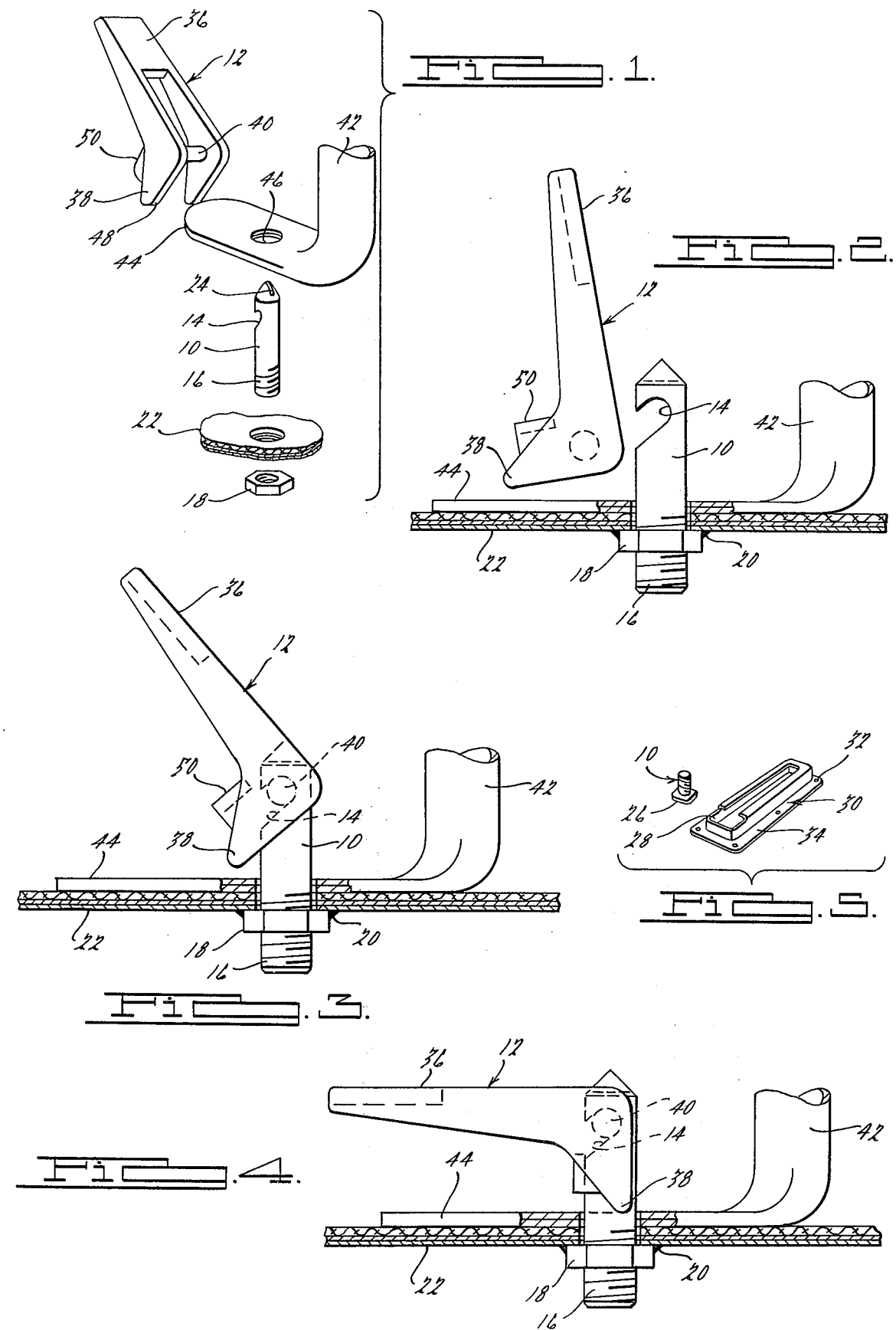

QUICK RELEASE SEAT RETAINER

BACKGROUND OF THE INVENTION

This invention relates to a clamping device of extreme simplicity and high effectiveness which can also be quickly and easily applied. The clamping device of this invention is particularly useful for securing seats in those environments where it is desirable that the seat be at times removable for purposes of cleaning, such as in train coaches, airplanes and buses, or simply where it is desired to provide greater load carrying space as with automotive van type vehicles.

At the present time such removable seating arrangements are secured to the vehicle floor by bolts, and when it is necessary to remove or replace such seats considerable time and labor are involved. Accordingly, while removable seats have long been provided they are generally difficult to remove.

SUMMARY OF THE INVENTION

The principal object of the present invention, in view of the foregoing, is to provide an improved clamping unit by which objects such as van, bus, train coach, airplane or like seats can be secured to a supporting floor structure in such a way that the seat may be removed from position or replaced quickly and with a minimum of effort.

The clamping unit of this invention basically comprises two components. One component is a stud or pin member which is attachable to the floor support and which is of a length such that it extends above the object to be secured to the floor. The end of the pin extending above the floor is provided with a notch or slot in which is received a fulcrum pin of the second and other component of the clamping unit which is a bell-crank or L-shaped compression lever. The compression lever is provided with a foot and is dimensioned such that pivotal movement of the lever about its fulcrum pin when in the notch of the stud carries the lever foot into engagement with the object to be secured, the pin component being thereby placed in tension while the object is compressed between the floor and the foot of the compression lever. When it is desired to remove the seat, it merely requires pivoting of the lever whereupon it separates from the stud permitting the seat to be lifted out. No tools are required for seat mounting or removal.

DESCRIPTION OF THE DRAWINGS

FIGS. 1 through 4 are perspective views of the clamping unit of this invention illustrating, in sequence, the use of the clamping unit to secure a seat having conventional seat support legs to a vehicle floor; and FIG. 5 is a perspective view illustrating an alternative method of attaching the pin component of the clamping unit to a floor support.

DETAILED DESCRIPTION

The clamping unit of this invention is seen with particular reference to FIG. 1 as comprising a stud or pin 10 and a compression lever 12. Pin 10 is provided with a slot 14 adjacent one end portion and its other end portion is provided with means whereby the pin can be retained on one of the objects to be secured by the clamping unit. Thus, FIGS. 1 through 4 illustrate an embodiment wherein the pin is provided with a threaded end portion 16 such that it can be threadedly engaged with a nut 18 which is spot welded as at 20 to a support floor 22 such as found in an automotive van type vehicle. A slot 24 is provided in the head of the pin to facilitate easy insertion or withdrawal of the pin, as well as adjustment of proper pin height relative to the floor. Obviously if the floor support is of sufficient thickness it could be threaded and the nut component illustrated in the Figures omitted. An alternative arrangement of securing the pin 10 to a floor support is shown in FIG. 5 wherein the pin is provided with an integrally formed head 26 which is receivable in the opening 28 in one end of a bracket 30 which can be fastened to a floor support by screws passing through the opening 32, or sunk into the floor and the bracket fastened to the floor underside by means of the flange 34.

The compression lever 12 is shown as having a L-shape with the long leg forming a handle portion 36 and the short leg a compression foot 38. In a preferred form, the compression lever has two spaced L-shaped members which are interconnected by a fulcrum pin 40. The L-shaped members are spaced a distance to just accommodate the pin 10 therebetween, and the fulcrum pin 40 is dimensioned so as to be receivable within the slot 14 of pin 10.

As indicated above, the clamping unit of this invention has been successfully employed in securing the rear bench seats in van type vehicles. In this application, which is depicted in the various figures of the drawing, the tubular support legs of the seat, one such leg 42 being shown in the drawing, are provided with a flatten end portion 44 capable of engagement with the floor support. This flatten end portion is provided with an aperture 46 through which the pin 10 can pass. To secure the seat in the van, it is merely required to locate the leg 42 about pin 10 (FIG. 2), engage the fulcrum pin 40 of compression lever 12 within slot 14 of pin 10 (FIG. 3) and pivot the compression foot 38 into engagement with the upper surface of leg portion 44 (FIG. 4).

If desired, the compression foot 38 can be provided with a cam surface such as at 48 so as to facilitate ease of movement of the compression lever 12 to its over center locked position. A stop surface 50 may also be provided on the compression lever 12 for engagement with pin 10 to insure proper positioning of these components. Lastly, it will be apparent that in addition to the seats, the pins 10 can be easily removed to provide a completely flat floor area when such might be desirable to, for example, accommodating sleeping bags.

I claim:

1. In a detachable seat for automotive vehicles comprising a seat frame, supporting legs for the seat frame each leg having a lower portion adapted to rest upon the vehicle floor and an aperture in each lower portion, a quick release clamping unit comprising a pin disposed in said aperture and extending outwardly on each side of said leg lower portion, one end portion of said pin being secured to said floor to position said pin generally normal thereto and the opposite end portion being provided with a notch, a compression lever comprising two L-shaped members spaced apart an amount sufficient to receive said pin therebetween, one leg of each of said L-shaped members having a caming surface compression foot and the other leg of each of said L-shaped members being a handle, a fulcrum pin extending between the L-shaped members adjacent the juncture of the long and short legs comprising the L- shape said compression lever being pivotally mounted on said pin with said fulcrum pin received in said slot of said pin, said lever being moveable to an overcenter seat retaining position wherein the compression foot of said compression lever engages the portion of the seat leg in contact with the vehicle floor and the handle position of said lever extends generally normal to said pin.

2. In a detachable seat for automotive vehicles comprising a seat frame, supporting legs for the seat frame, each leg having a lower portion adapted to rest upon the vehicle floor and an aperture in each lower portion, a quick release clamping unit comprising a compression lever and a pin, said pin having a first end portion secured to said floor support such that said pin extends through the apertured lower portion of a supporting leg, and a notch adjacent its opposite end portion, said compression lever comprising two members spaced apart an amount sufficient to receive said pin therebetween, a fulcrum pin extending between said spaced members and received within the slot of said pin, one portion of said lever having a caming surface for engaging the lower portion of a supporting leg, said lever having a handle extending generally at right angles to said caming portion by which the lever can be pivoted about its fulcrum pin, said fulcrum pin of said compression lever being portioned in said notch to provide pivotal movement of the lever to an overcenter position wherein said caming surface engages said support bracket and said handle projects generally normal to said pin.

3. A quick-release clamping unit according to claim 2 wherein said first end portion of said pin is threadedly engageable with said floor and wherein the opposite end head portion is provided with a slot for accommodating a tool to facilitate insertion or removal of said pin in the floor.

4. A quick release clamping unit according to claim 2 wherein said compression lever is provided with a stop member which engages said pin when said compression lever is in a clamping position, said stop member extending between the spaced members of said lever.

* * * * *